(12) United States Patent
Mahvi

(10) Patent No.: US 6,259,486 B1
(45) Date of Patent: Jul. 10, 2001

(54) SENSOR UNIT FOR CONTROLLING TELEVISION SET OPERATION

(76) Inventor: A. Pascal Mahvi, P.O. Box 529, Novelty, OH (US) 44072

(*) Notice: Subject to any disclaimer, the term of this patent is extended or adjusted under 35 U.S.C. 154(b) by 0 days.

(21) Appl. No.: 09/421,687

(22) Filed: Oct. 20, 1999

(51) Int. Cl.[7] .............................. H04N 5/44; H04N 5/63
(52) U.S. Cl. .......................................... 348/553; 348/730
(58) Field of Search ................................. 348/553, 730, 348/552, 61, 152, 706, 180, 82, 125, 819; 365/226, 227, 229; 340/310.06, 310.01, 517, 825.06; H04N 5/44, 5/63

(56) References Cited

U.S. PATENT DOCUMENTS

| | | | |
|---|---|---|---|
| 3,764,819 | 10/1973 | Muller | 307/116 |
| 5,408,276 | 4/1995 | Morales | 348/818 |
| 5,495,302 | 2/1996 | Abruna | 348/819 |
| 5,521,652 | * 5/1996 | Shalvi | 348/819 |
| 5,541,664 | * 7/1996 | Cuadrado | 348/553 |
| 5,793,409 | 8/1998 | Tetsumura | 348/1 |
| 5,805,201 | 9/1998 | Fujiwara | 348/5.5 |
| 5,905,544 | * 5/1999 | Lee | 348/730 |

\* cited by examiner

*Primary Examiner*—Sherrie Hsia
(74) *Attorney, Agent, or Firm*—Stetina Brunda Garred & Brucker

(57) ABSTRACT

A viewer-presence sensor unit for controlling operation of a television set. The sensor unit first includes a detector for sensing presence of a living being near the television set and a timer for measuring the amount of time of non-presence of a living being. Second, the sensor unit incorporates a power interruption switch activated by the detector for terminating power to the television set upon reaching a measurement of a term of time of non-presence of a living being. Preferably, the term of time is a selectable period, and can range from less than an hour to 24 hours depending upon the needs and viewing habits of a user. Detectors can non-limitedly be chosen from motion sensor and heat sensors, and preferably have utility up to a reasonable viewing distance from the television set. In this manner television sets not in use are automatically turned off to thereby conserve resources otherwise expended as a result of non-viewed operating sets.

6 Claims, 1 Drawing Sheet

SENSOR UNIT FOR CONTROLLING TELEVISION SET OPERATION

CROSS-REFERENCE TO RELATED APPLICATIONS

Not Applicable

STATEMENT RE: FEDERALLY SPONSORED RESEARCH/DEVELOPMENT

Not Applicable

FIELD OF THE INVENTION

This invention relates in general to controlled operation of electrically powered devices, and in particular to controlled operation of a television set whereby a viewer-presence sensor unit having a detector for sensing presence of a living being near the set automatically turns the set off after a period of time passes in which no viewer presence is detected.

BACKGROUND OF THE INVENTION

A generally accepted principle is that conservation of natural resources is important. These resources include water, fuel sources, air quality, land space, and the like, many of which are non-renewable and therefore very valuable. A major commodity whose production can depend upon employment and/or destruction of one or more natural resources is electricity. This valuable asset powers thousands of devices throughout the world as daily activities proceed, many times without user concern about resource neglect. In a typical home, for instance, electricity is available for operating a myriad of appliances, audio and video equipment, and a host of miscellaneous apparatus.

Chief among the electricity users are television sets singly, and more often plurally, present in every home. Thus, for example, one home may have a set in the living room, one or more sets in bedrooms, and a set in a recreation room or den. Especially where a plurality of sets are in a residence, typically more than one set is turned on and then left on, even when the viewer has left the room. While one such neglected and operating set causes hardly a measurable impact on electricity or resource use, millions of such neglected and operating sets significantly impact natural resource reserves associated with electricity production, land fill contributions due to premature set malfunctions, environmental pollution due to increased manufacturing in connection with the replacement of inoperative sets, and the like. Consequently, it is apparent that widespread television operation control can accomplish significant conservation by simply shutting down television sets that are not being viewed.

In accord with the above considerations, it is a primary object of the present invention to provide a viewer-presence sensor unit for controlling operation of a television set and for terminating power to the television set when a viewer is not present.

Another object of the invention is to provide a viewer-presence sensor unit for controlling operation of a television set wherein the detector for sensing presence of a living being near the set is a motion or heat sensor.

Yet another object of the present invention is to provide a viewer-presence sensor unit for controlling operation of a television set wherein a timer associated therewith terminates power to the set upon reaching a set time period during which no viewer presence is detected.

These and other objects of the present invention will become apparent throughout the description thereof which now follows.

BRIEF SUMMARY OF THE INVENTION

The present invention is a viewer-presence sensor unit for controlling operation of a television set. The sensor unit first includes a detector for sensing presence of a living being within a viewable distance of the television set and a timer for measuring the amount of time of non-presence of a living being within that viewable distance. Second, the sensor unit incorporates a power interruption switch activated by the detector for terminating power to the television set upon reaching a measurement of a term of time of non-presence of a living being. Preferably, the term of time is a selectable period, and can range from less than an hour up to 24 hours depending upon the needs and viewing habits of a user. The detector can non-limitedly be chosen from a motion sensor and a heat sensor having sensing utility up to a viewable distance of the television set. In this manner television sets not in use are automatically turned off to thereby conserve resources otherwise expended as a result of non-viewed operating sets.

BRIEF DESCRIPTION OF THE SEVERAL VIEWS OF THE DRAWING

An illustrative and presently preferred embodiment of the invention is shown in the accompanying drawings in which.

DETAILED DESCRIPTION OF THE INVENTION

Figure 1:
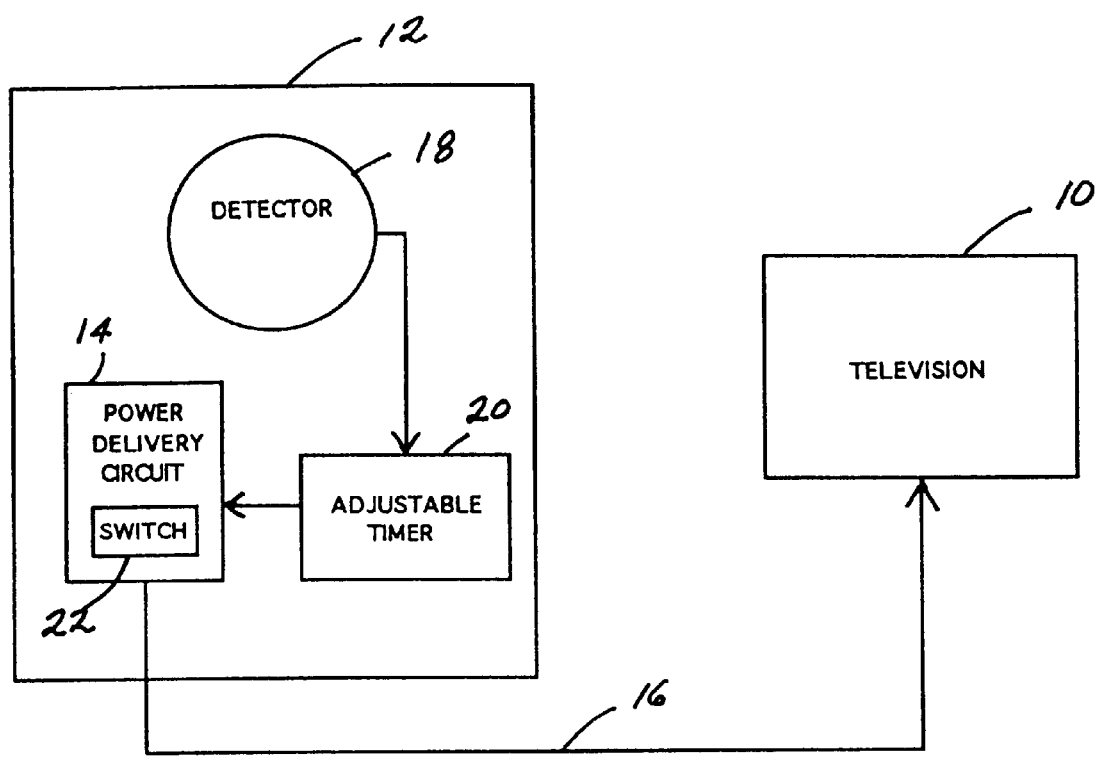
FIG. 1 is a schematic illustration of a viewer-presence sensor unit in association with a television set.

Referring to FIG. 1, a standard television set 10 is in operable connection to a viewer-presence sensor unit 12. The electrically operable sensor unit 12 includes a standard power delivery circuit 14 thereof into which a power cord 16 of the television set 10 is plugged, and a detector 18 for sensing presence of a living being (not shown). The detector 18 can be a conventional motion sensor or a conventional heat sensor. Preferably, sensing distance of the detector 18 should be sufficient to adequately service a viewable distance of the television set, such as may be represented in a distance of up to about 25 feet from the television set 10.

The detector 18 is in communication with an adjustable timer 20, also in communication with the power delivery circuit 14, and relays a presence-signal to the timer 20 each time the detector 18 senses presence of a living being. Immediately after receiving such a presence-signal, the timer 20 begins counting down to a preset time period which has been entered by a user If another presence-signal is received by the timer 20 prior to expiration of the preset time period, the timer 20 automatically resets itself to once again begin counting down the full preset time period. It is preferred that the presettable time period choice includes increments such as 30–60 minutes up to 24 hours. If no presence-signal is received by the timer 20 prior to reaching the preset time period, the timer 20 relays a shut-down signal to the power delivery circuit 14 which, in turn, activates a power interruption switch 22 to thereby terminate power to the television set 10. Once the television 10 is so turned off, the reappearance of a living being within the sensor range of the detector 18 does not result in re-establishment of power delivery to television 10. Rather, a viewer must activate power delivery which, in turn, automatically initiates operation of the sensor unit 12. As is thus apparent, the viewer-presence sensor unit 12 effectively controls operation of a television set through termination of power thereto when a viewer is not present for a reasonable period of time.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A viewer-presence sensor unit for controlling operation of a television set, the sensor unit comprising:
   a) a detector for sensing presence of a living being within a viewable distance of the television set and a timer for measuring the amount of time of non-presence of a living being to thereby provide a timer measurement;
   b) a power delivery circuit for delivering electricity to the television set and for receiving the timer measurement; and
   c) a power interruption switch activated by the power delivery circuit for terminating power to the television set upon reaching a timer measurement equal to a pre-set term of time.

2. A viewer-presence sensor unit as claimed in claim 1 wherein the pre-set term of time is a selectable period.

3. A viewer-presence sensor unit as claimed in claim 2 wherein the selectable period is between about 15 minutes and 60 minutes.

4. A viewer-presence sensor unit as claimed in claim 2 wherein the selectable period is 24 hours.

5. A viewer-presence sensor unit as claimed in claim 1 wherein the detector is a motion sensor.

6. A viewer-presence sensor unit as claimed in claim 1 wherein the detector is a heat sensor.

\* \* \* \* \*